June 29, 1926.
C. M. ANDERSON
VALVE FOR VACUUM LINES
Filed March 30, 1923
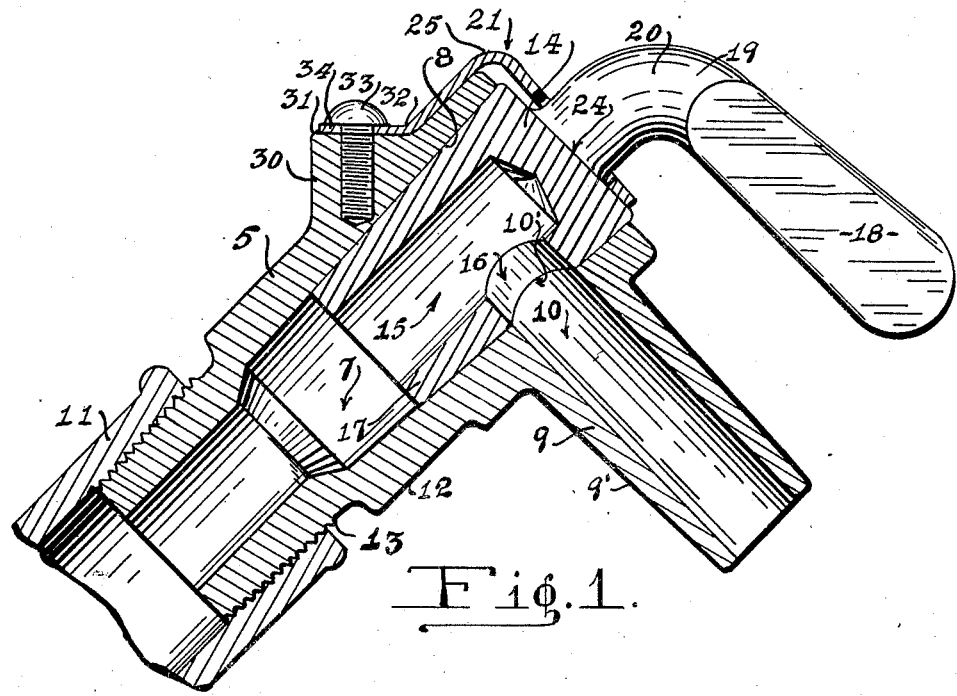
Fig. 1.
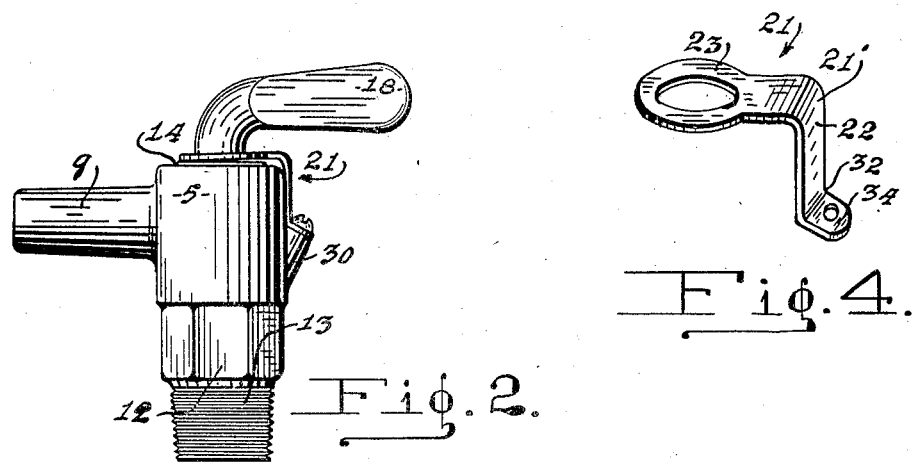
Fig. 2.
Fig. 4.
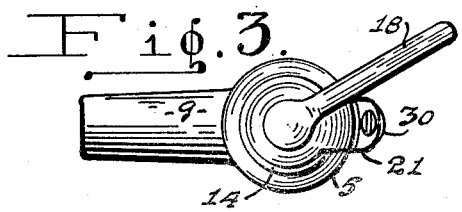
Fig. 3.
Charles M. Anderson.
INVENTOR
BY *J. W. Sheeley*
ATTORNEY Patented June 29, 1926.

1,590,794

UNITED STATES PATENT OFFICE.

CHARLES M. ANDERSON, OF LOS ANGELES, CALIFORNIA.

VALVE FOR VACUUM LINES.

Application filed March 30, 1923. Serial No. 628,800.

My invention relates to valves for vacuum lines and the like, and pertains more particularly to a valve for use in cow milking machines.

The invention has for its principal object the provision of a simple, sanitary and inexpensive valve, easy of operation while capable of preventing leakage of air into the line.

Another object of the invention is to provide a valve that is self draining and which upon being closed will not retain milk or moisture in its parts to become frozen or foul the valve.

Another object of the invention is to provide a valve of the above character which may be easily disassembled for cleaning.

Another object of the invention is to provide a valve in which the rubbing parts may be easily lubricated.

A further object of the invention is to provide a valve of the above character which is adapted to automatically take up all wear.

It will be understood in consideration of the invention that valves of the usual conical plug type are subject to high friction between the plug and the plug-seat when a high degree of vacuum is carried and are, therefore difficult of operation and tend to stick.

It is therefore still another object of my invention to provide a valve of the above character in which the frictional contact between the plug and its seat can be lessened, while turning the plug, without possibility of the plug not properly reseating.

Still other objects and advantages will appear hereinafter and will be better understood by virtue of their occurrence.

I have illustrated by the accompanying drawings a preferred embodiment of the invention.

In the said drawings,

Figure 1, is a view in vertical section of the said embodiment showing it in its operative position.

Figure 2, is a side view of the valve.

Figure 3 is a plan view thereof.

Figure 4 is a perspective view of a part hereinafter known as the plug retainer.

More specifically, in carrying out my invention in the embodiment shown, I employ a valve body 5, preferably a single casting formed with a through passage or bore 7, which at the upper end is increased in diameter and encompassed by a valve seat 8 of slightly decreasing diameter downwardly. In order to effect a good seal the angle of the seat should be very slight. Said body in conformance with a salient feature of my invention is inclined somewhat from the vertical, preferably at an angle of 45 degrees. The body includes an integral discharge spout 9, formed with a smooth tapering outer surface 9', so that a rubber hose or the like (not shown) may be conveniently attached. The spout is formed with a fluid passage 10, which intersects bore 7, of the body to provide a discharge port 10' in the valve seat.

The valve body is here shown as attached to a 45 degree fitting 11, whereby it is held at the proper angle, and for purpose of such attachment, a hexagonal portion 12 is provided on the body immediately above a threaded portion 13.

Coacting with the plug-seat, to control the discharge port, a tapered plug 14 is provided which conforms to the plug-seat and also effects a closure for the upper open end of the valve body. The plug is of inverted cup form with an interior space 15. The annular wall 16 of the plug, which encompasses said space, is provided with a single port 17 in alignment with the discharge port on the seat.

Integral with the plug a key 18 is provided, which is of substantially round cross section adjacent the plug, as at 19, and which is bent at right angle as at 20, to extend in parallel with the discharge spout.

One of the salient features of my invention resides in a plug retainer 21, capable of allowing the plug to be raised slightly from its seat while yieldably forcing it to return. Said retainer, in the embodiment shown, comprises a single blank of metal 21', providing an arm 22 and a ring 23. The ring is capable of sliding over the key easily when the valve is being assembled, and while encompassing portion 19 of the key, it rests upon the upper surface 24 of the plug. The blank is bent as at 25, near the intersection of said arm and ring at slightly less than 90 degrees.

This provides for slight yieldability to the ring when the arm is held stationary, and should the ring be raised slightly to increase the angle it will be yieldably forced to return to original position.

The valve is provided with a boss 30, extending therefrom at an angle, preferably about 45 degrees, from the valve body, so that with the latter inclined as shown, a top surface 31 of the boss is horizontally disposed.

The arm is bent again at the lower end, as at 32, to extend contiguous to the top surface of the boss. A screw 33 serves to hold the end 34 of the arm upon the boss, while the major portion of said arm is held contiguous with the surface of the valve body.

In the operation of the device the plug may be turned as required to open or close the discharge port. Owing to the slight angle of the plug and its seat a vacuum existing in the bore of the valve will result in the plug being held securely on its seat to effect a complete seal against atmospheric air tending to enter, and friction between the plug and its seat will be appreciable when the vacuum is high. For the purpose of easy operation of the plug, and for the purpose of introducing a lubricant to the seat when required, said plug may be raised relative to its seat. Obviously, with the plug and valve body inclined at the angle shown the pressure difference between atmosphere and the interior of the valve might not readily reseat the plug; since the plug would tend to fall away from co-axial alignment with its seat. The plug, however, would be returned quickly and accurately by the spring-like quality of the plug retainer. It will also be apparent that the valve as a whole will be lower in manufacturing cost, quickly assembled, and very readily dissembled for inspection, cleaning or replacement of parts.

It will be seen now that I have provided a valve which in addition to the above mentioned advantages may be inclined in the position shown without interfering with its efficiency, and when so inclined will be self draining, so that in the case of cow milking machines, milk will not be retained in the valve when the machine is not in operation, to foul or gum the parts or to freeze and break the valve or render it inoperative, and While I have shown a specific construction and arrangement of parts, I do not limit myself to any specific construction or arrangement of parts but may alter same as occasion requires without departing from the spirit of my invention, within the appended claims.

I claim;

1. In combination with a vertical valve body having a conical bore in an end thereof, a conical valve fitted in said bore and extended from the upper end thereof above said body, a handle of smaller diameter extended from said plug, and a boss on said body presenting a surface which intersects the vertical body at an obtuse angle; of a member blanked from sheet spring metal and comprising, a strip secured to said boss contiguous with said surface; said strip being bent at an obtuse angle to extend upward along said body to a bend disposed slightly above the upper end of the body; said bend being slightly less than a right angle, and a ring integral with said strip encompassing said handle and engaging the extended end of said plug.

2. The combination with a vertical valve body having a conical bore in an end thereof, a conical valve fitted in said bore with the upper end protruding sightly, and a handle of reduced diameter extended from said valve; of a member blanked from sheet spring metal and comprising a vertical strip held contiguous with the side of said body extended to a point slightly above the top of said body and there bent at an angle slightly less than 90 degrees to extend substantially parallel with the top of said valve, and a ring integral with said strip encompassing said handle and engaging the top of said valve.

3. The combination with a valve body having a conical bore in an end thereof, a conical valve fitted in said bore, and a handle of reduced diameter extended from said valve whereby a shoulder is provided at the intersection of the handle and conical valve; of a member blanked from sheet metal and comprising a strip held contiguously parallel with the side of said body and extended to the top thereof and there bent to extend yieldably at substantially a right angle, and a ring encompassing said handle and attached to the bent end of said strip to be yieldably held upon said shoulder.

4. In an article of the character described, a relatively vertical valve body having a vertical bore in an end thereof, a conical plug fitting in said bore, a handle of smaller diameter extended from said plug so that a shoulder is provided at the intersection of the handle and plug, a boss on the vertical outer side wall of the body; said boss having a surface extending outwardly and downwardly from the vertical side at an obtuse angle, a strip of metal bent at substantially a right angle near its upper end and further bent at an obtuse angle near its lower end so that when the lower end is contiguous with the surface of the boss the upper end will be substantially parallel with said shoulder, and means extending from the upper end of said strip for yieldably contacting with the shoulder to hold the plug yieldably in place within the body.

CHARLES M. ANDERSON.